United States Patent [19]

Tanner

[11] Patent Number: 4,557,163

[45] Date of Patent: Dec. 10, 1985

[54] SHIELD STRIPPER FOR ELECTRICAL WIRING

[75] Inventor: John G. Tanner, Wellington, Kans.

[73] Assignee: The Boeing Company, Seattle, Wash.

[21] Appl. No.: 629,700

[22] Filed: Jul. 11, 1984

[51] Int. Cl.[4] .............................................. H02G 1/12
[52] U.S. Cl. ...................................... 81/9.44; 30/91.1
[58] Field of Search ...................... 81/9.44, 9.41, 9.42, 81/9.43; 30/90.1, 91.1

[56] References Cited

U.S. PATENT DOCUMENTS

| | | | |
|---|---|---|---|
| 1,801,706 | 4/1931 | Westfall | 30/91.1 |
| 1,977,677 | 10/1934 | Hill | 30/91.1 |
| 2,120,398 | 6/1938 | Edwards et al. | 30/91.1 |
| 4,059,893 | 11/1977 | Solury | 30/90.1 |
| 4,426,778 | 1/1984 | Christie | 30/90.1 |

Primary Examiner—James L. Jones, Jr.
Attorney, Agent, or Firm—Edwin H. Crabtree

[57] ABSTRACT

A rotary outer shield stripper for electrical wiring. The stripper received around the wiring and having a cutting blade mounted on the stripper for engaging and cutting through the outer wiring shield. The wiring is then slowly pulled away from the stripper a desired distance. As the wire is pulled away, the blade rotates following the contour of the inner spirally wrapped wires cutting away the shield without cutting the wires and its insulation.

8 Claims, 5 Drawing Figures

SHIELD STRIPPER FOR ELECTRICAL WIRING

BACKGROUND OF THE INVENTION

This invention relates to a wire stripper and more particularly a stripper for removing an outer shield surrounding a plurality of electrical wires having insulation therearound.

Heretofore the removing of the shield from around electrical wiring was done by hand and often resulted in high labor and material costs due to the careless nicking of the underlying wire which resulted in rejection of the wiring material.

The subject invention eliminates the use of hand stripping methods and allows for consistent and effective removal of shielding around electrical wiring. In the following United States Patents, U.S. Pat. No. 3,623,384 to Murphy, U.S. Pat. No. 4,027,557 to Stepan, U.S. Pat. No. 4,059,893 to Solury and U.S. Pat. No. 4,117,749 to Economu, various types of wire stripping and cable cutting devices are described. None of them particularly point out the unique features and advantages of the subject rotary shield stripper as described herein.

SUMMARY OF THE INVENTION

The rotary shield stripper for electrical wiring can be made to receive any size wire or number of wires in a bundle for quickly and efficiently removing the shield.

The invention eliminates the use of hand held stripping methods and allows for consistent and efficient removal of the shielding without the careless nicking of the underlying wire and wire insulation.

The rotary shield stripper for removing a shield from around one or more electrical wires includes a cylindrical bearing housing having an opening through the length thereof. A bearing is mounted inside the opening of the housing with a wire guide shaft mounted inside the bearing. The shaft extends outwardly from the housing and has a wire guide opening in one end thereof with an elongated wire guide aperture through the shaft. The opening and aperture receive a shield and wire bundle therethrough. A cutting blade having a blade edge is received in a blade guide opening in the shaft. A movable collar is disposed around the shaft and the cutting blade. When the collar is moved to a forward position away from the housing the blade edge is pivoted and lowered downwardly into a portion of the wire guide opening for engaging and cutting through the shield.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
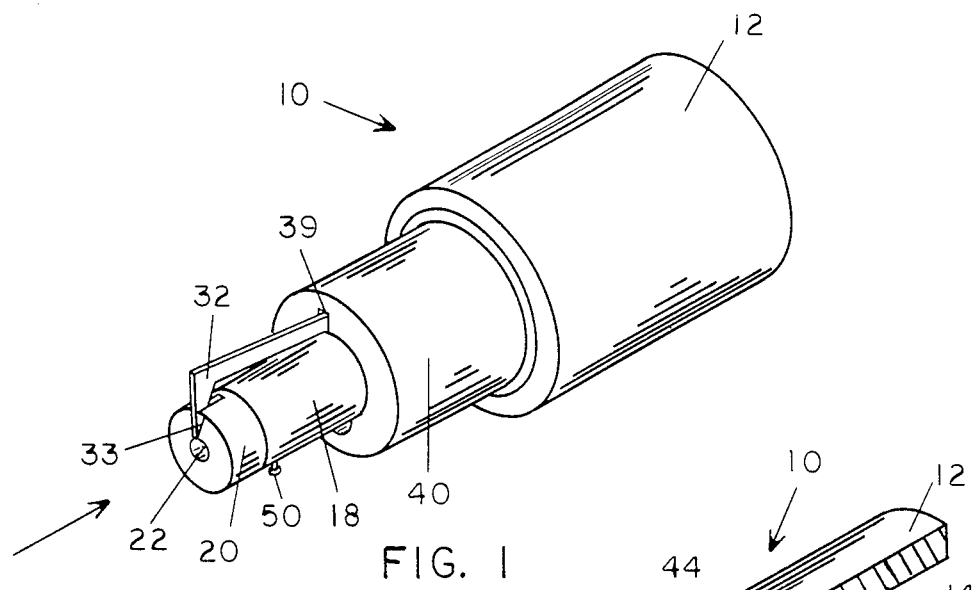
FIG. 1 is a perspective view of the rotary shield stripper

FIG. 1 a perspective view of the rotary shield stripper is shown and designated by general reference numeral 10. The stripper 10 includes a cylindrical bearing housing 12 which can be used as a handle and having an opening 14 therethrough and shown in FIG. 2. A ball bearing 16 is mounted in one end of the housing with a wire guide shaft 18 attached to the inner race of the ball bearing 16. The ball bearing 16 allows the wire guide shaft 18 to rotate independently of the bearing housing 12.

The wire guide shaft 18 extends outwardly from the housing 12 and includes a removable head 20 with a wire guide opening 22 which is dimensioned to receive different sizes and bundles of electrical wiring having a shield therearound. The shaft 18 further includes an elongated wire guide aperture 24 communicating with the opening 22 and extending along the length of the shaft 18 for receiving the wire bundle therethrough.

Figure 2:
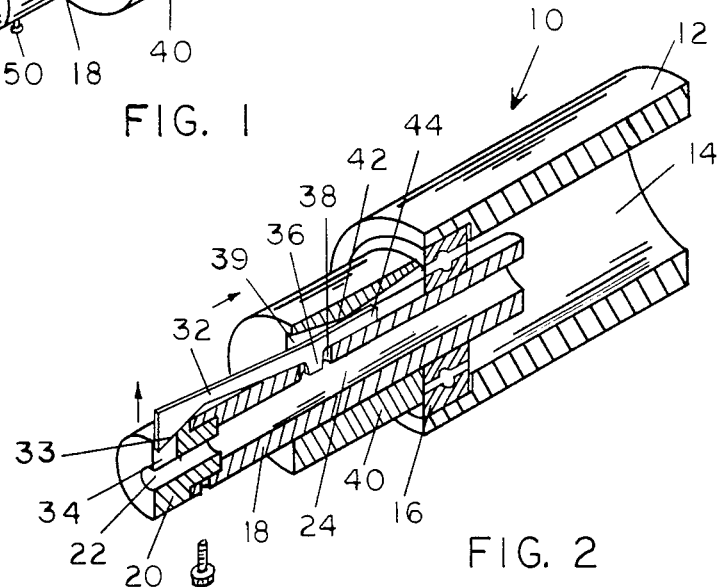
FIG. 2 is a perspective sectional view of the stripper.
Figures 2A, 2B:
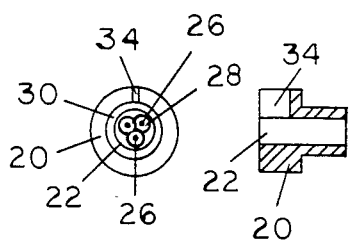
FIGS. 2A and 2B are a front and side sectional view of a removable head.

In FIG. 2A a front view of the removable head 20 can be seen with the wire guide opening 22 contoured for receiving in this example three electrical wires 26 having insulation 28 therearound with a shield 30 disposed around the insulators 28 and wires 26. FIG. 2B illustrates a side sectional view of the head 20 without the wires 26.

Referring now back to FIG. 2 an elongated cutting blade 32 is mounted on the top of the shaft 20 with the blade 32 having a cutting blade edge 33 received in a blade slot 34 in the head 20 and extending downwardly into the wire guide opening 22. A pivot arm 36 of the blade 32 is received in a pivot hole 38 in the top of the shaft 18. The cutting blade 32 is held in place in a collar groove 39 of a cylindrical collar 40 which is movable along the length of the shaft 18. The collar 40 is shown in a rear position adjacent the housing 12. A cam surface 42 engages an opposite end portion 44 of the blade 32 raising the edge 33 upwardly away from the opening 22.

Figure 3:
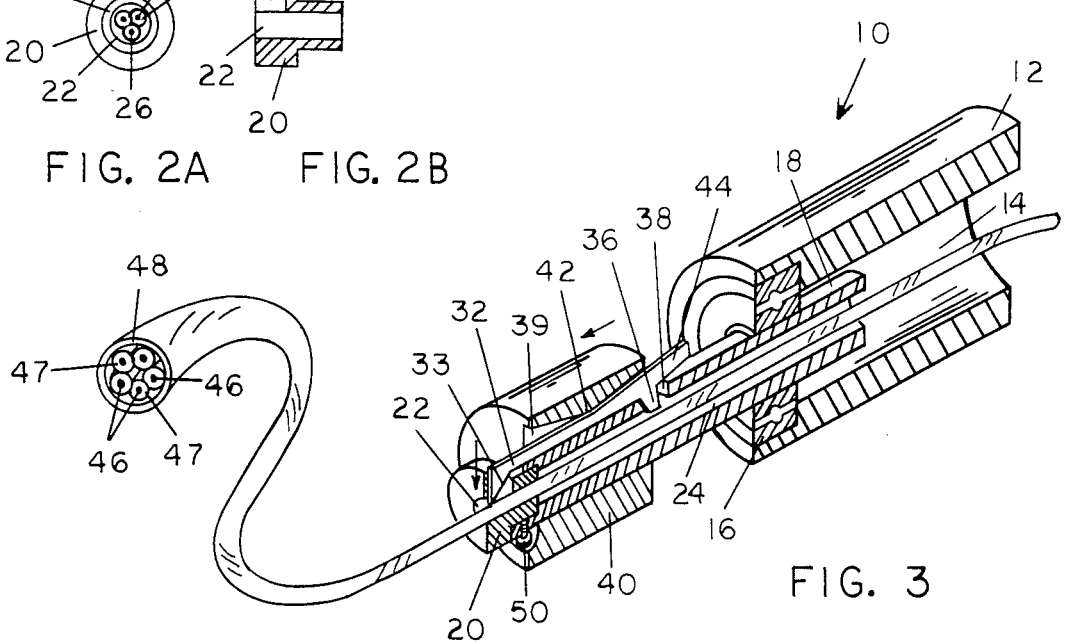
FIG. 3 is a perspective sectional view of the rotary shield stripper with the cutting blade engaging and cutting through the shield of the electrical wiring.

Referring now to FIG. 3 the stripper 10 can be seen receiving five external wires 46 through the opening 22 and inserted through the wire guide aperture 24 and extending along the length of the housing 12. The wires 46 are inserted a desired length for removing a shield 48 from the wires. In this view the movable collar 40 has been moved to the left in a forward position where it engages a stop screw 50 in the end of the shaft 18. In this position the cam surface 42 of the collar 40 pivots the edge 33 downwardly in the slot 34 cutting through the shield 48 but not cutting the wires 46 with insulation 47. The stop screw 50 extending outwardly from the end of the shaft 18 prevents the collar 40 from being removed from the stripper 10 and when loosened allows removal of the head 20.

With the cam surface 42 of the collar 40 holding the blade edge 33 downwardly in the wire guide opening 22 the electrical wires 46 can now slowly be moved to the left away from the stripper 10. As this occurs the collar 40 with the cutting blade 32 and shaft 18 rotate in the bearing housing 12 as the blade edge 33 cuts through the shield 48 following the contour of normally spirally wound wires 46 with the cutting edge 33 cutting through and along the length of the shield 48 for removing the shield 48 from the spirally wrapped electrical wires 46.

It can be appreciated while the electrical wires 26 and 46 are shown in the drawings any combination and number of wires can be used with the stripper 10 for removing a similar type of shield by merely adapting the wire guide opening 22 of the removable head 20 for the size and contour of a wire bundle requiring a shield stripping operation.

Changes may be made in the construction and arrangement of the parts or elements of the embodiments as described herein without departing from the spirit or scope of the invention defined in the following claims.

What is claimed is:

1. A rotary shield stripper for removing a shield from around one or more electrical wires enclosed therein, the stripper comprising:

a cylindrical bearing housing having an opening therethrough;

a bearing mounted inside the opening of the housing;

a wire guide shaft rotatably mounted inside the bearing, the shaft extending outwardly from the housing and having a wire guide aperture through the length of the shaft, the aperture adapted for receiving the electrical wires with shield therethrough;

a cutting blade having a blade edge received in a blade slot in the shaft; and a movable collar disposed around the shaft and cutting blade, when the collar is moved to a forward position outwardly from the housing the blade is pivoted and the blade edge is lowered downwardly in the blade slot for cutting through the shield.

2. The stripper as described in claim 1 further including a removable head mounted on the end of the shaft and having a wire guide opening therethrough.

3. The stripper as described in claim 2 wherein the wire guide opening is contoured for receiving various sizes of wires with shield therearound.

4. The stripper as described in claim 1 wherein the cutting blade includes a pivot arm received in a pivot hole in the top of the shaft, as the collar moves to a forward position the blade pivots on the pivot arm.

5. The stripper as described in claim 1 wherein the collar has a collar groove with cam surface, the top of the cutting blade received in the groove with the cam surface engaging the blade.

6. A rotary shield stripper for removing a shield from around one or more electrical wires enclosed therein, the stripper comprising:

a cylindrical bearing housing having an opening therethrough;

a bearing mounted inside the opening of the housing;

a wire guide shaft rotatably mounted inside the bearing, the shaft extending outwardly from the housing and having a wire guide aperture through the length of the shaft, the aperture adapted for receiving the electrical wires with shield therethrough;

a removable head mounted on one end of the shaft and having a wire guide opening therethrough, the wire guide opening communicating with the wire guide aperture;

an elongated cutting blade having a blade edge at one end thereof, the blade edge received in a blade slot in the shaft, the blade further having a pivot arm received in a pivot hole in the top of the shaft; and a removable collar disposed around the shaft and cutting blade when the collar is moved to a forward position outwardly from the housing the blade is pivoted on the pivot arm and the blade edge is lowered downwardly in the blade slot for cutting through the shield.

7. The stripper as described in claim 6 wherein the collar has a collar groove along the length of the inner circumference of the collar with a cam surface in the groove, the top of the cutting blade received in the groove with the cam surface engaging the blade as the collar is moved along the length of the shaft.

8. The stripper as described in claim 6 further including a stop screw threaded into the end of the shaft and the removable head for securing the removable head to the end of the shaft, the stop screw also acting to engage the side of the movable collar as the collar is moved outwardly to the forward position on the shaft.

* * * * *